(12) United States Patent
Kuah et al.

(10) Patent No.: US 9,199,396 B2
(45) Date of Patent: Dec. 1, 2015

(54) SUBSTRATE CARRIER FOR MOLDING ELECTRONIC DEVICES

(75) Inventors: Teng Hock Kuah, Singapore (SG); See Yap Ong, Singapore (SG); Ji Yuan Hao, Singapore (SG); Kai Wu, Singapore (SG); Ee Ling Chiw, Singapore (SG)

(73) Assignee: ASM TECHNOLOGY SINGAPORE PTE LTD, Singapore (SG)

( * ) Notice: Subject to any disclaimer, the term of this patent is extended or adjusted under 35 U.S.C. 154(b) by 789 days.

(21) Appl. No.: 12/836,645

(22) Filed: Jul. 15, 2010

(65) Prior Publication Data

US 2012/0013040 A1    Jan. 19, 2012

(51) Int. Cl.
*B29C 45/14*    (2006.01)
*B29C 45/40*    (2006.01)
*B29L 11/00*    (2006.01)

(52) U.S. Cl.
CPC ..... *B29C 45/14639* (2013.01); *B29C 45/14065* (2013.01); *B29C 45/14778* (2013.01); *B29C 45/40* (2013.01); *B29L 2011/00* (2013.01)

(58) Field of Classification Search
CPC ................................................. B29C 45/14639
USPC ..................................................... 264/272.15
See application file for complete search history.

(56) References Cited

U.S. PATENT DOCUMENTS 7,678,617 B1 *   3/2010 Bayan ........................... 438/123

* cited by examiner

*Primary Examiner* — Larry Thrower
(74) *Attorney, Agent, or Firm* — Ostrolenk Faber LLP (57) ABSTRACT

A method of molding a substrate containing a plurality of electronic devices by providing a carrier comprising a frame which includes an adhesive film. The substrate is mounted onto the adhesive film of the carrier such that the frame surrounds the substrate. The carrier is placed in a mold such that the frame is located at a clamping area of the mold and the substrate is located at a molding area of the mold where molding cavities are located. The frame is clamped at the clamping area while the electronic devices are located in the molding cavities for molding with an encapsulant.

13 Claims, 11 Drawing Sheets

SUBSTRATE CARRIER FOR MOLDING ELECTRONIC DEVICES

FIELD OF THE INVENTION

The present invention relates to the molding of electronic devices, and in particular to the molding of electronic devices which are mounted on brittle substrates.

BACKGROUND AND PRIOR ART

For electronic devices with optical elements, such as light-emitting diode ("LED") devices, the optical element is typically molded with a layer of transparent or translucent molding encapsulant. In prior art molding systems for such electronic devices, the said molding encapsulant is usually molded by either dispensing the molding encapsulant into molding cavities directly or by injection molding to produce individual packages. The yields obtained by molding the optical elements using these methods are generally unsatisfactory.

More recently, compression molding has provided a viable solution for improving productivity by molding a panel of LED devices simultaneously. This form of molding involves molding a single panel of LED devices mounted on a substrate, such as a ceramic substrate, which has high heat capacity and low heat conductance. A problem that is often encountered with the molding of devices mounted on a brittle substrate such as a ceramic substrate is that the ceramic substrate holding the devices may crack during the molding procedure due to excessive clamping pressure exerted during molding. It would therefore be desirable to improve the yield from molding LED devices mounted on brittle substrates by the use of compression molding and yet reduce incidences of breakages of the brittle substrates.

SUMMARY OF THE INVENTION

It is thus an object of the invention to seek to provide a method of molding multiple electronic devices simultaneously in order to increase productivity, while avoiding breakage of brittle materials comprised in the electronic devices.

Accordingly, the invention provides a method of molding a substrate containing a plurality of electronic devices, comprising the steps of: providing a carrier comprising a frame including an adhesive film; mounting the substrate onto the adhesive film of the carrier such that the frame surrounds the substrate; placing the carrier in a mold such that the frame is located at a clamping area of the mold and the substrate is located at a molding area of the mold where molding cavities are located; clamping the frame at the clamping area while locating the electronic devices in the molding cavities; and thereafter molding the electronic devices located in the molding cavities with an encapsulant.

It will be convenient to hereinafter describe the invention in greater detail by reference to the accompanying drawings. The particularity of the drawings and the related description is not to be understood as superseding the generality of the broad identification of the invention as defined by the claims.

BRIEF DESCRIPTION OF THE DRAWINGS

An example of a molding system according to the preferred embodiment of the invention will now be described with reference to the accompanying drawings, in which.

DETAILED DESCRIPTION OF THE PREFERRED EMBODIMENT OF THE INVENTION

Figure 1:
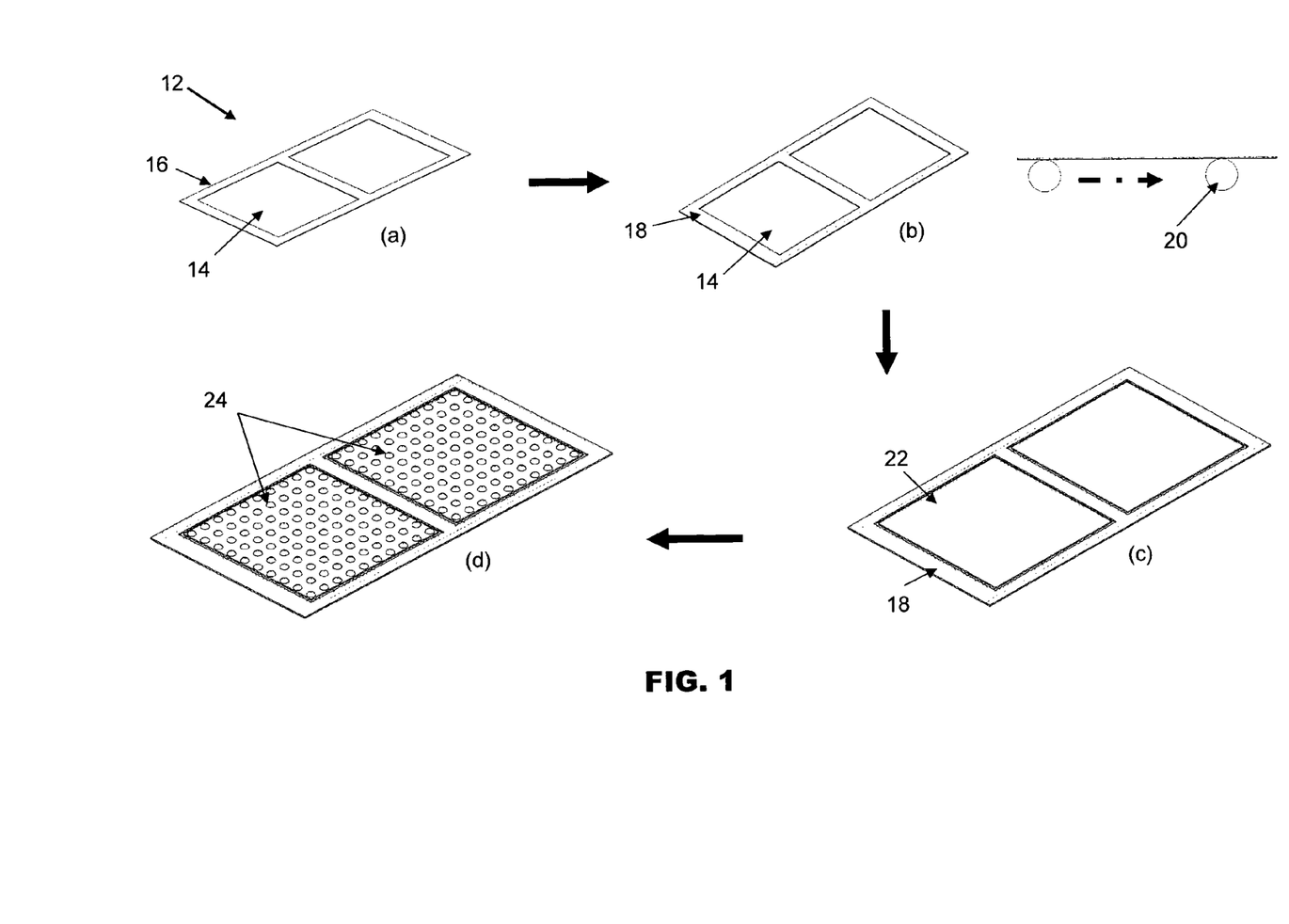
FIG. 1 illustrates the application of a substrate carrier according to the preferred embodiment of the invention for compression molding of electronic devices such as LED devices.

FIG. 1 illustrates the application of a substrate carrier according to the preferred embodiment of the invention for compression molding of electronic devices such as LED devices. The substrate carrier 12 comprises a frame 16 surrounding a hollow mounting position 14 and onto which a backing tape 18 is attached. Multiple frames 16, which are preferably metallic, may surround a plurality of mounting positions 14 for mounting multiple substrates, as shown in FIG. 1(a).

FIG. 1(b) shows a backing tape 18 covering the mounting positions 14 on the substrate carrier 12. The backing tape 18 is preferably an adhesive film to which one or more substrates or substrate panels 22 are mountable such that the frame 16 surrounds each mounted substrate panel 22. The backing tape 18 may be laid on the frame 16 by means of a taping roller 20.

FIG. 1(c) shows substrate panels 22 made from materials such as ceramic and silicon which are adhered to the backing tape 18 at the mounting positions 14 of the substrate carrier 12. FIG. 1(d) shows LED devices 24 mounted on the substrate panels 22 having been molded with molding encapsulant formed in domed shapes. Each molded substrate panel 22 is subsequently removed from the backing tape 18 of the substrate carrier 12 for the singulation of the individual LED devices 24.

Figure 2:
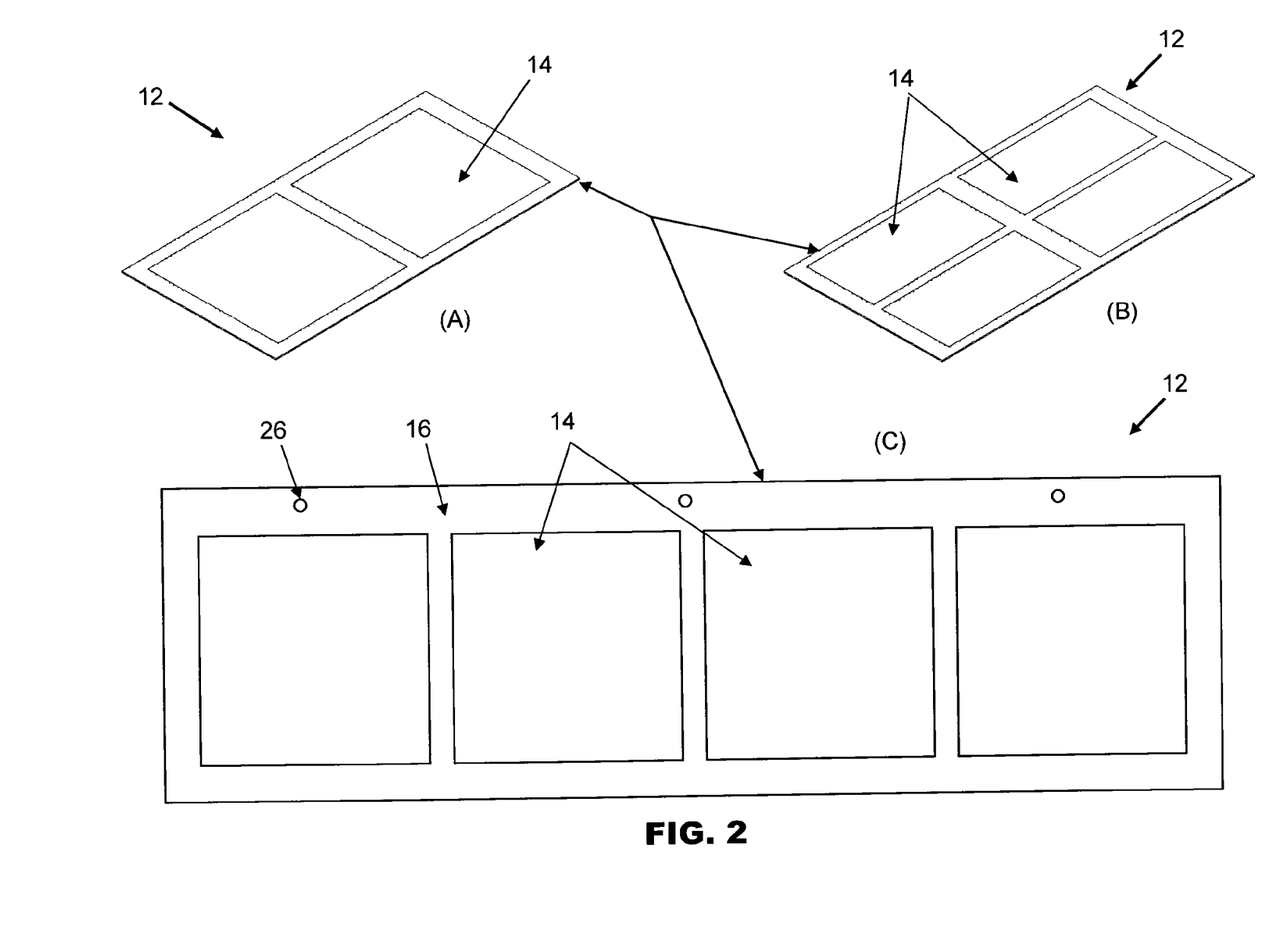
FIG. 2 illustrates examples of different configurations of substrate carriers which may be used with the invention.

FIG. 2 illustrates examples of different configurations of substrate carriers 12 which may be used with the invention. The substrate carrier 12 may comprise two hollow mounting positions 14 as in FIG. 2(A) which is configured to carry a pair of ceramic substrate panels 22. More than two ceramic substrate panels 22 can also be mounted on a substrate carrier 12 surrounding two pairs of hollow mounting positions 14 arranged in rows of two or in a single row as shown in the embodiments of FIG. 1(B) and FIG. 1(C) respectively.

Figure 3:
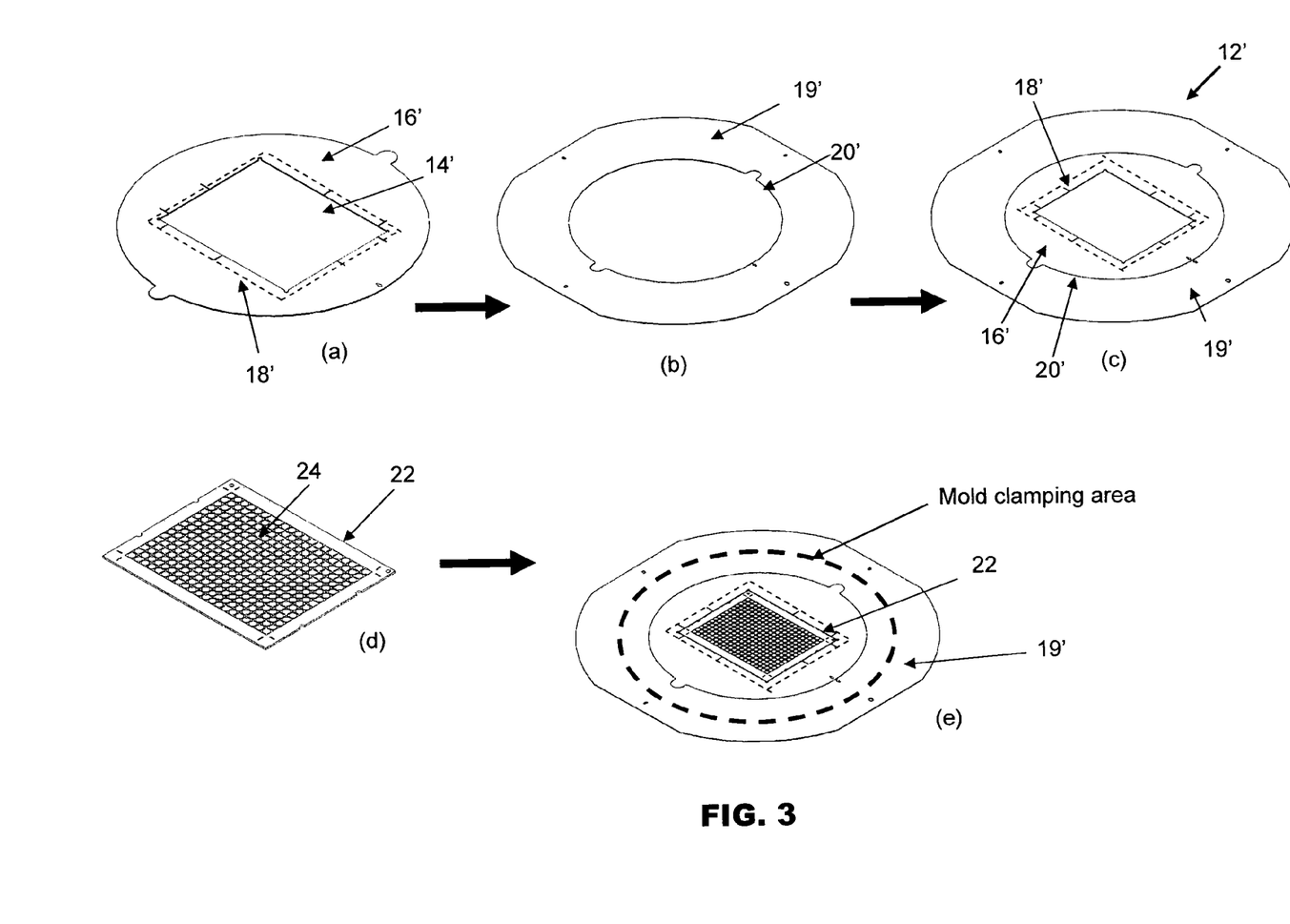
FIG. 3 illustrates the application of a wafer ring as a substrate carrier according to the preferred embodiment of the invention for compression molding of LED devices.

FIG. 3 illustrates the application of a wafer ring 12' as a substrate carrier according to the preferred embodiment of the invention for compression molding of LED devices 24. The wafer ring 12' includes an inner carrier comprising an inner frame 16' as shown in FIG. 3(a), which is mounted within a perimeter of an outer frame 19' as shown in FIG. 3(b). The inner frame 16' is a wafer frame with a hollow mounting position 14' in the center which is covered by an adhesive film or backing tape 18' to which a substrate is mounted. The outer frame 19' may comprise a wafer ring that is larger than the inner frame 16' and has a mounting position 20' corresponding to the shape and size of the inner frame 16' so that the inner frame 16' may be fitted therein as shown in FIG. 3(c).

FIG. 3(d) illustrates an example of a substrate panel such as a ceramic substrate panel 22 carrying LED devices 24 which are mounted on it. The ceramic substrate panel 22 is mounted on the adhesive surface of the backing tape 18' of the wafer ring 12' before molding the LED devices. In FIG. 3(e), the outer frame 19' or wafer ring serves as the clamping area during molding of the LED devices 24. Therefore, the ceramic substrate panel 22 does not experience a large clamping force during molding that might cause it to crack. Each molded ceramic substrate panel 22 is subsequently removed from the backing tape 18' of the wafer ring 12' for the singulation of the individual LED devices 24.

Figure 4:
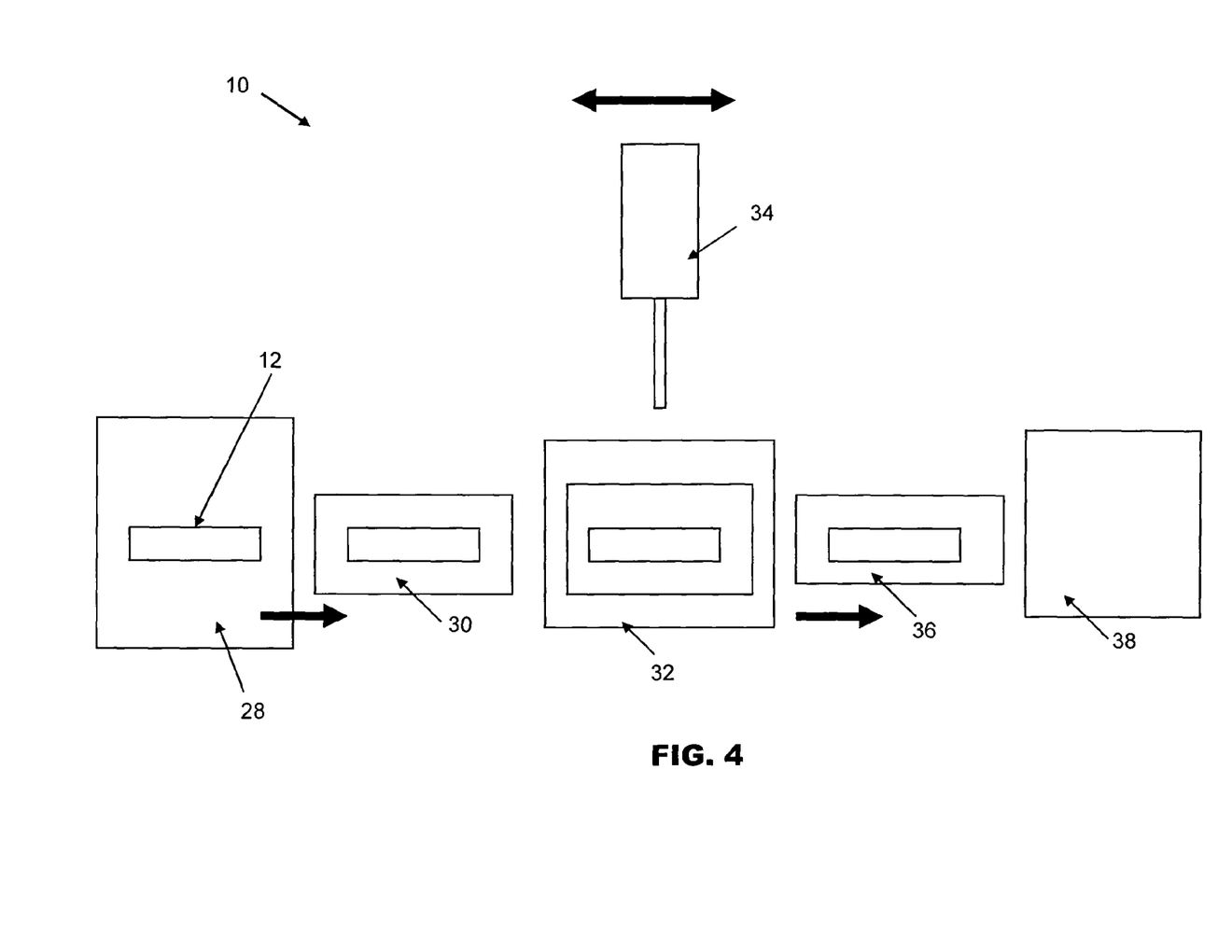
FIG. 4 is a schematic illustration of a compression molding procedure in a molding system for molding LED devices mounted on a substrate panel which is supported on the substrate carrier.

FIG. 4 is a schematic illustration of a compression molding procedure in a molding system 10 for molding LED devices mounted on a substrate panel which is supported on the substrate carrier 12. At an input magazine elevator 28, a substrate carrier 12 carrying a brittle substrate panel with LED devices for molding is loaded onto a first indexer 30. It is transported to a molding apparatus 32 for compression molding. At the molding apparatus 32, a dispenser 34 dispenses a liquid molding encapsulant into molding cavities. The substrate panel is then placed onto the molding cavities such that the LED devices positioned therein are molded with an encapsulant.

Next, the substrate carrier 12 is indexed by a second indexer 36 and the molded LED devices on the substrate panels are transported to an output magazine elevator 38 for offloading before further processing such as singulation of the LED devices. In another working mode, the substrate carrier 12 may be manually fed and positioned into the molding apparatus 32 for dispensation of liquid molding encapsulant onto the LED devices for molding the LED devices.

Figure 5:
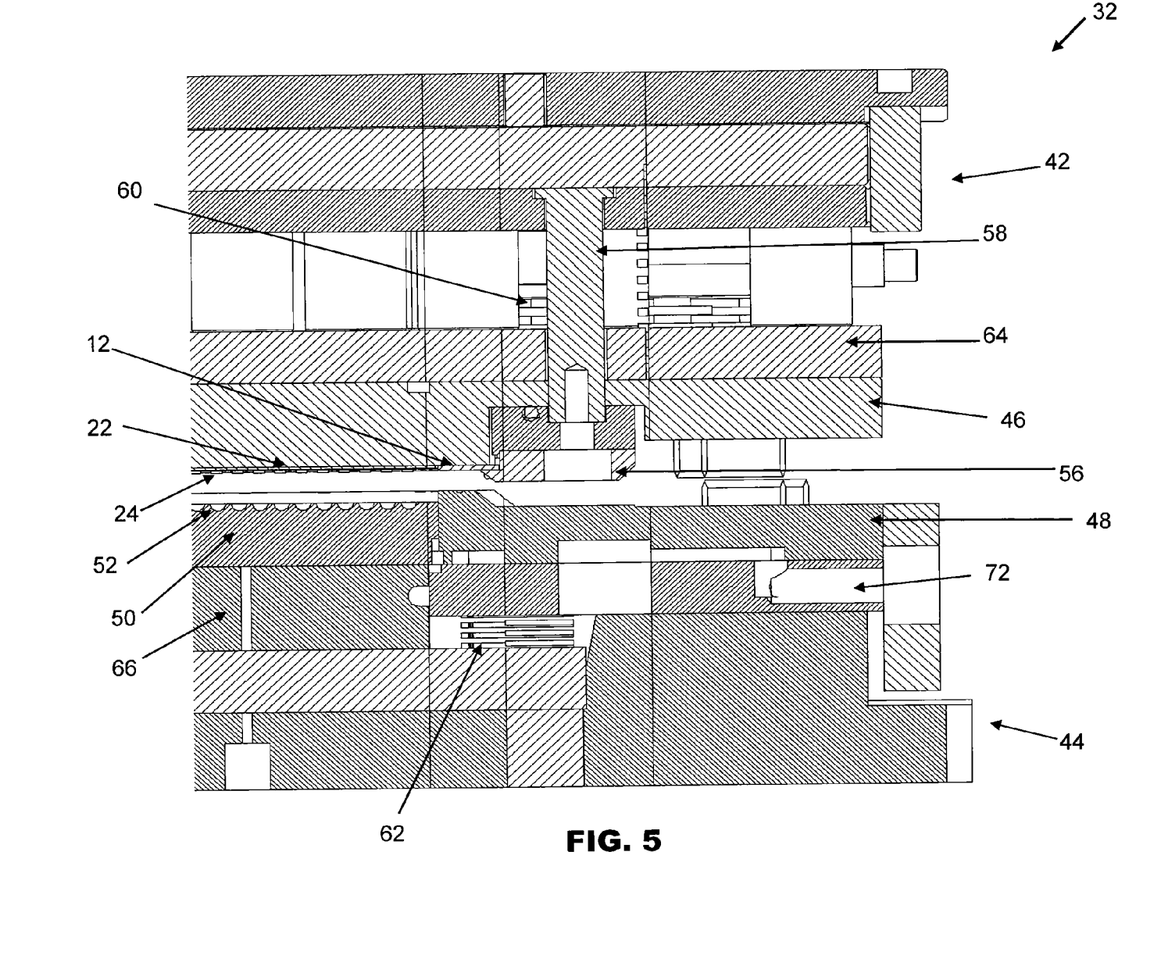
FIG. 5 is a partial sectional view of a molding apparatus of the compression molding system, wherein the substrate carrier is held against a top cavity plate of the molding apparatus.

FIG. 5 is a partial sectional view of a molding apparatus 32 of the compression molding system 10, wherein the substrate carrier 12 is placed in the molding apparatus 32 and held against a top cavity plate 46 of the molding apparatus 32. The molding apparatus 32 includes a top mold 42 and a bottom mold 44 which are operative to move relative to each other to close onto and apply a clamping force onto the frame 16 of the substrate carrier 12 at a clamping area of the molding apparatus 32. The top cavity plate 46 is located at a base of the top mold 42 while a bottom cavity plate 48 is located at a top of the bottom mold 44. The substrate panel 22 is positioned in a molding area of the molding apparatus 32 where molding cavities are located so that the substrate panel 22 does not experience the full clamping force exerted by the top and bottom molds 42, 44 at the clamping area.

A mold insert such as a dome insert 50 is detachably insertable into the bottom mold 44 at the molding area of the molding apparatus 32 and is precisely located in the bottom cavity plate 48. The dome insert 50 comprises a number of molding cavities 52 which may be dome-shaped, each of which is sized and configured to permit the insertion of an LED device 24 into a molding cavity 52. While the frame 16 of the substrate carrier 12 is located and directly clamped at the clamping area of the molding apparatus 32 between the top cavity plate 46 and the bottom cavity plate 48 during molding, the LED devices 24 mounted on the substrate carrier 12 and located in the molding cavities 52 can be molded with encapsulant.

The top mold 42 further supports a track plate 56, which extends along the top mold 42 and is held thereto by means of a support rod 58. The track plate 56 grips a side of the substrate carrier 12 and is operative to move the substrate carrier 12 relative to both the top and bottom molds 42, 44 such as vertically up and down between the top mold 42 and the bottom mold 44. Only one side of the track plate 56 is shown, but there should be a similar track plate at the opposite end of the substrate carrier 12 so that both sides of the substrate carrier 12 are held simultaneously. An actuation force may be provided by a motor above the top mold 42 for lifting and lowering the track plate 56 via the support rod 58. After the substrate carrier 12 is placed in the mold, the track plate 56 applies a holding force on the carrier 12 against the top mold 42. When the track plate 56 is lowered away from the top mold 42, the track plate 56 releases its holding force on the substrate carrier 12 against the top mold 42.

The top and bottom molds 42, 44 include respective top and bottom support plates 64, 66 which are preferably spring-loaded by resilient means, such as by respective springs 60, 62, such that the top and bottom support plates 64, 66 are spring-biased towards the substrate carrier 12. he top support plate 64 is located adjacent to the top cavity plate 46 and applies a compression force to the top cavity plate 46 via the said spring bias, which in turn applies a compression force onto the substrate carrier 12 after the frame 16 has been clamped at the clamping area. Further, the dome insert 50 is movable relative to the substrate panel 22 to contact and press the molding cavities 52 against the substrate panel 22 when molding encapsulant is being molded onto the LED devices 24. This prevents leakage of the molding encapsulant on the surface of the substrate panel 22. At the same time, the bottom support plate 66 which is adjacent to the bottom cavity plate 48 applies a compression force to the bottom cavity plate 48, which in turn applies a compression force onto the substrate carrier 12 when the top and bottom molds 42, 44 are clamped against each other. The positions of the molding cavities 52 in the dome insert 50 correspond to the positions of the rows of LED devices found on the substrate panel 22. Accordingly, molding encapsulant is molded onto the LED devices 24 by the molding cavities 52 during molding.

Figure 6:
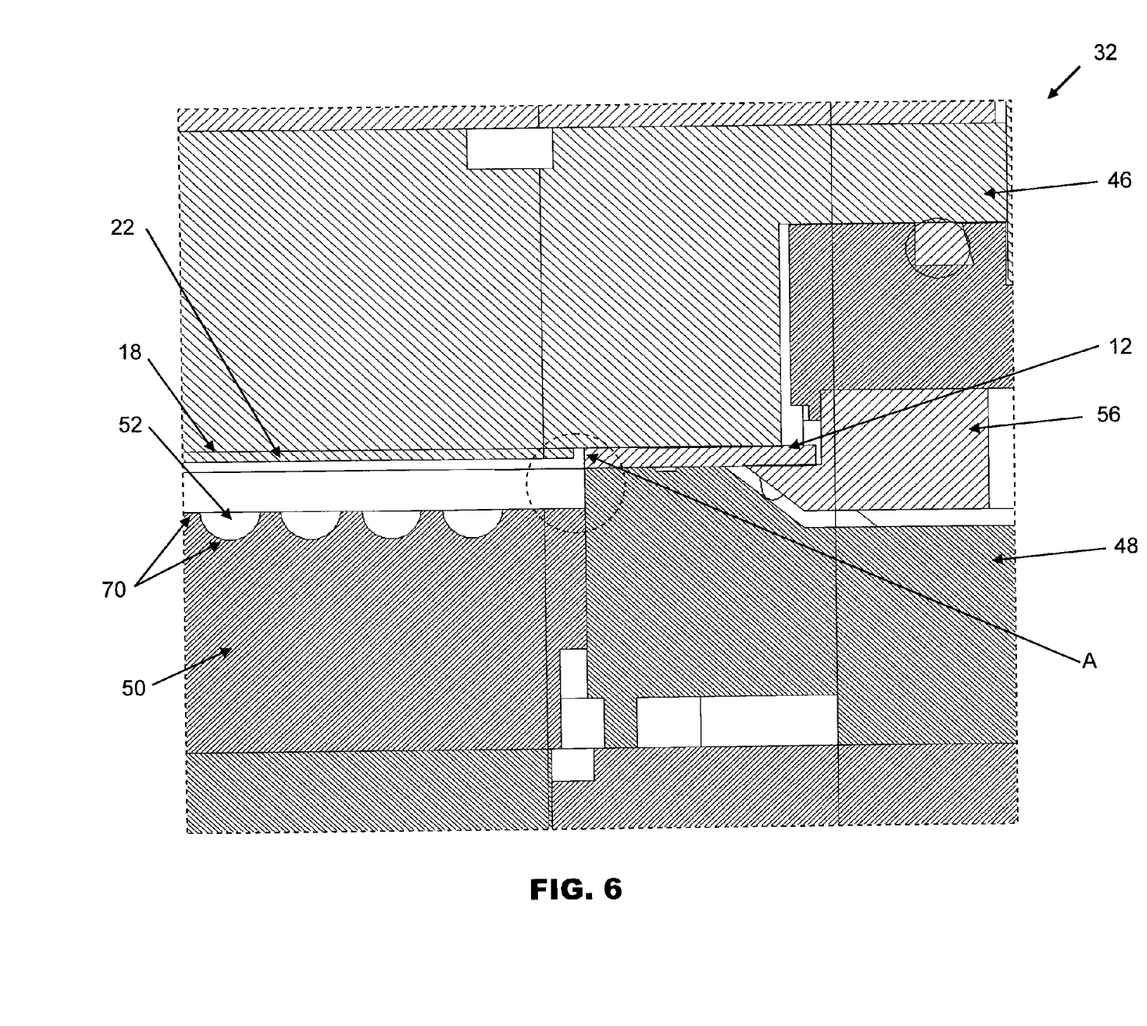
FIG. 6 is an enlarged sectional view of a clamping area of the molding apparatus of FIG. 5.

FIG. 6 is an enlarged sectional view of a clamping area of the molding apparatus 32 of FIG. 5. The substrate panel 22 is mounted to the substrate carrier 12 by means of the adhesive backing tape 18. The substrate panel 22 carries LED devices 24 which are each inserted into a molding cavity 52 included in the dome insert 50 on the bottom cavity plate 48. It can be seen that the substrate panel 22 is mounted on the backing tape 18 such that it is spaced from the frame 16 of the substrate carrier 12 which is held against the top cavity plate 46 by the track plate 56. Hence, the substrate panel 22 is not subjected to the bulk of the clamping force, and as a result, cracking or breakage of the substrate panel 22 is avoided.

The dome insert 50 is covered by a release film 70 which extends across the molding cavities 52. This helps to separate the molded LED devices 24 from the dome insert 50 after molding.

Figure 7:
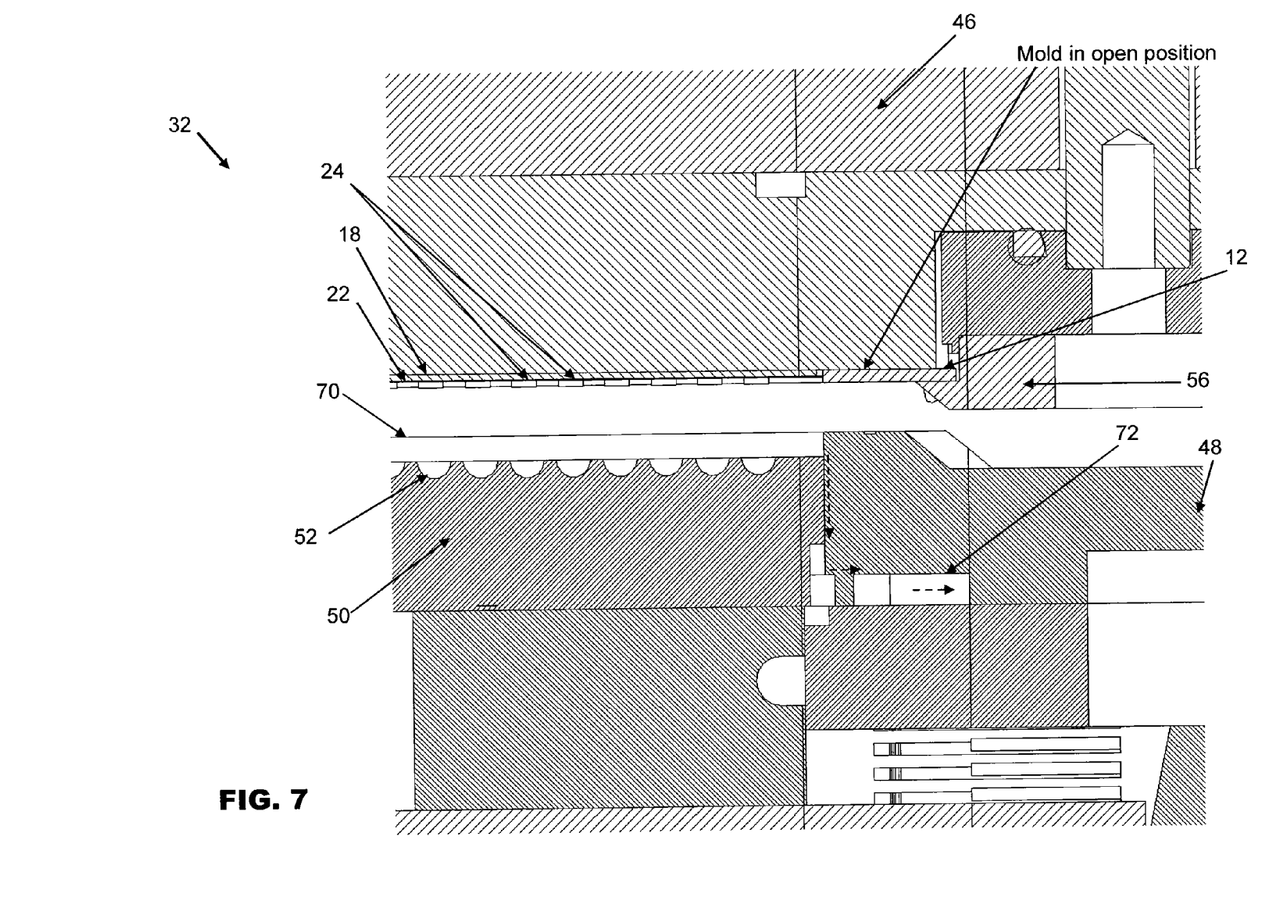
FIGS. 7 to 11 show an exemplary molding sequence for LED devices mounted on the substrate carrier.

FIGS. 7 to 11 show an exemplary molding sequence for LED devices 24 transported on the substrate carrier 12. When the molding apparatus 32 is in an open position as shown in FIG. 7, the top and bottom cavity plates 46, 48 are spaced apart and the substrate carrier 12 is indexed to the molding position where it is held against the top cavity plate 46 by the track plate 56. In this position, each LED device 24 is positioned over a corresponding molding cavity 52.

Vacuum suction 72 is provided in the bottom cavity plate 48 such that the release film 70 which is overlaying the molding cavities 52 is sucked into each molding cavity 52. A molding encapsulant such as liquid silicone is dispensed into each cavity 52 on top of the release film 70. In this way, the release film facilitates easy separation of molded LED devices 24 from the molding cavity 52. The top cavity plate 46 holds the substrate carrier 12 and the substrate panel 22 mounted thereto in a stand-by mode when the molding apparatus 32 is open.

Figure 8:
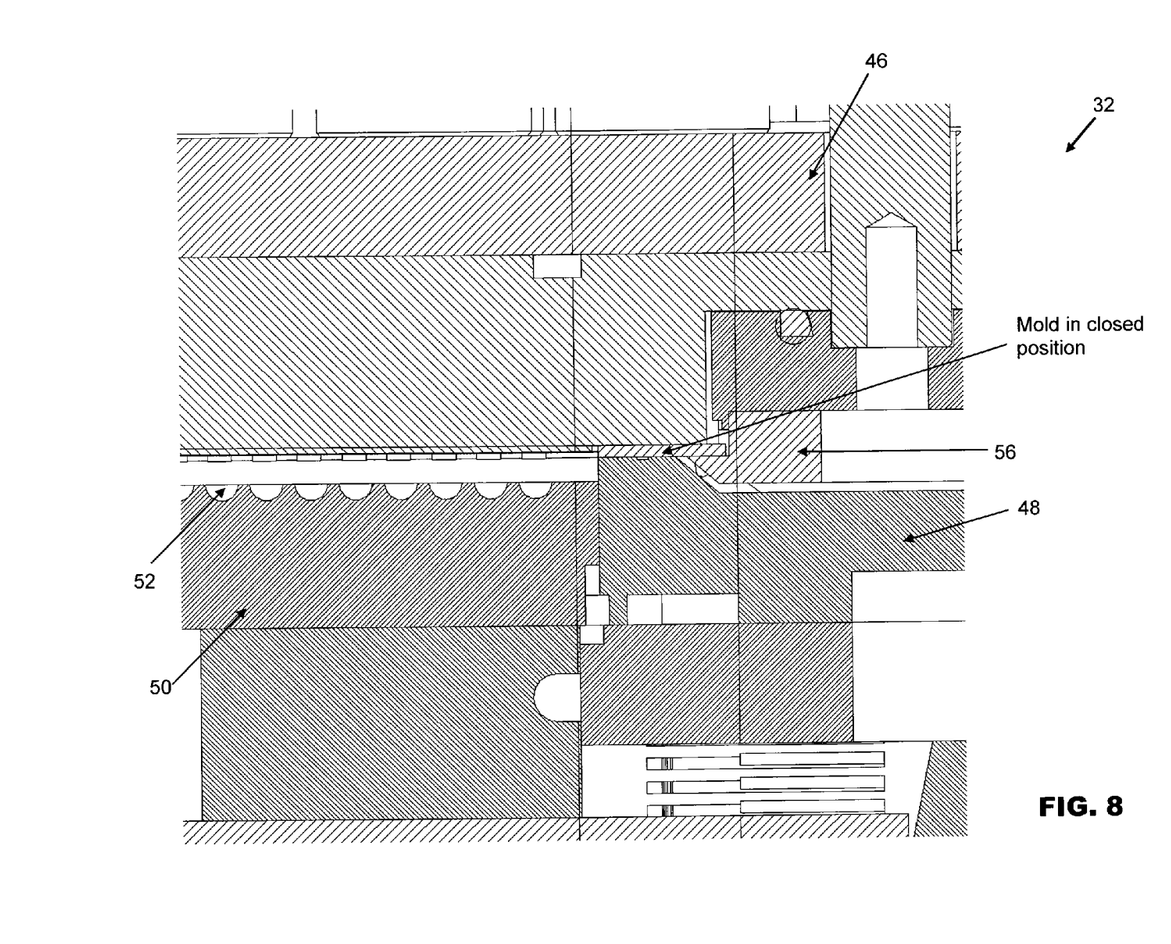
Figure 9:
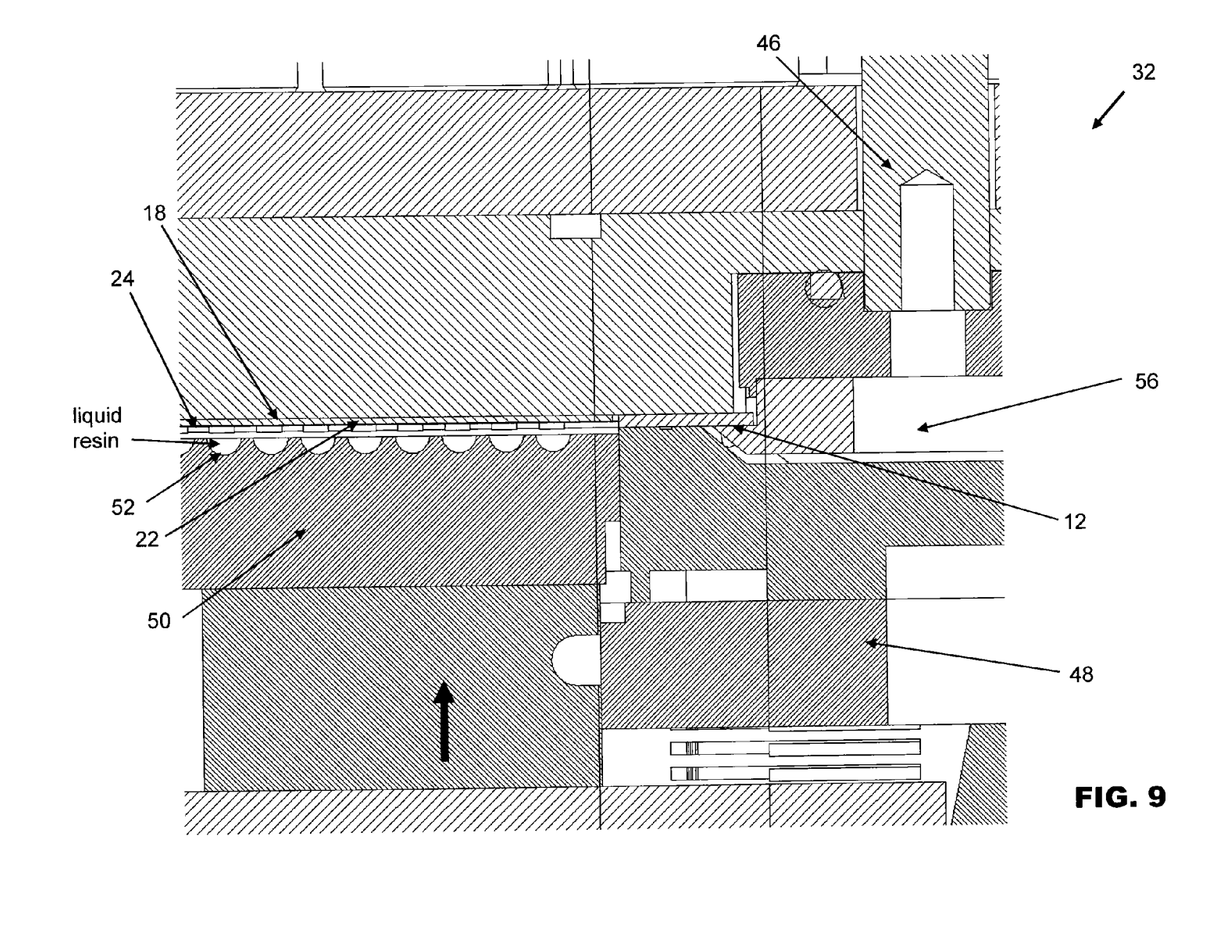
Figure 10:
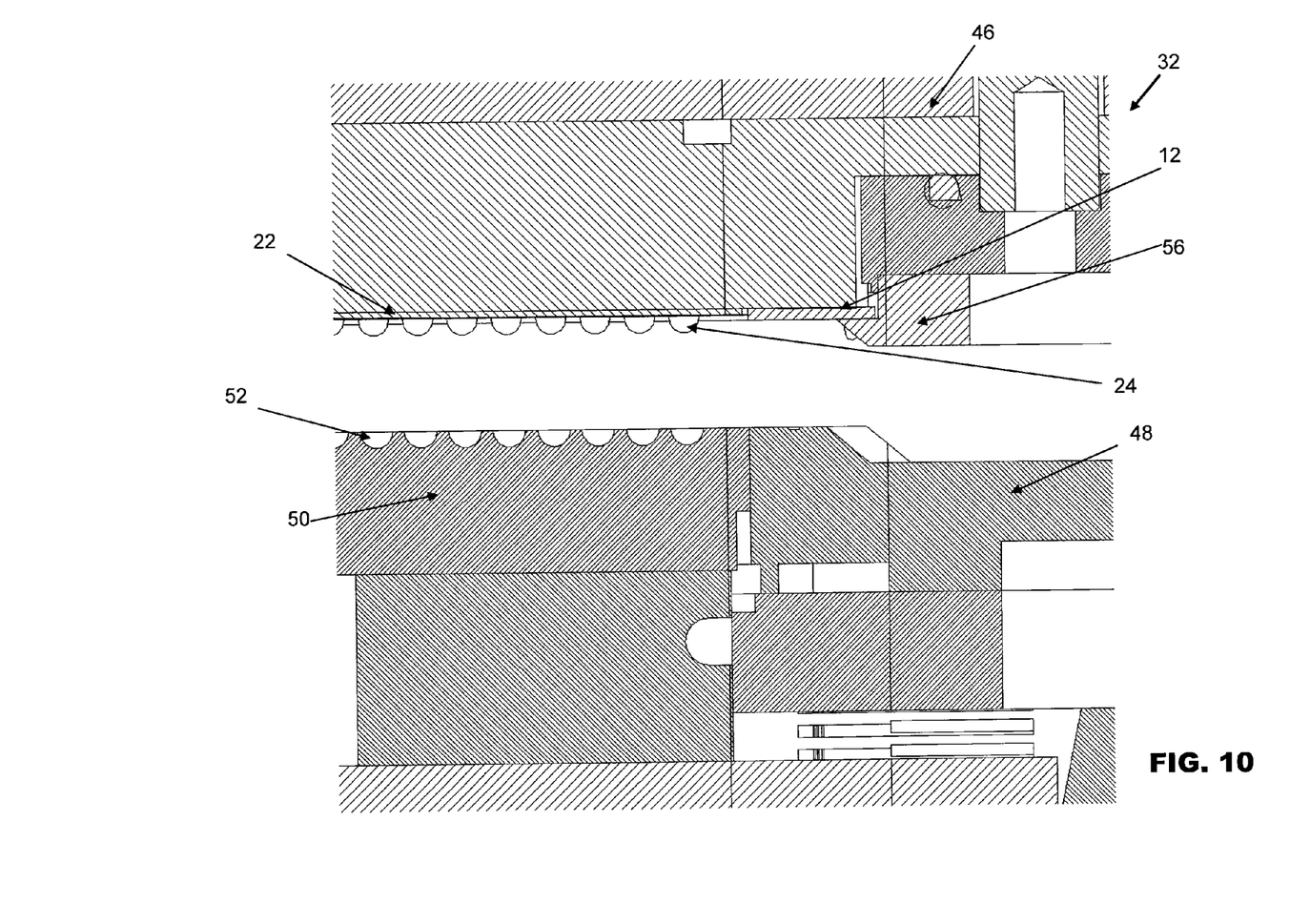
Figure 11:
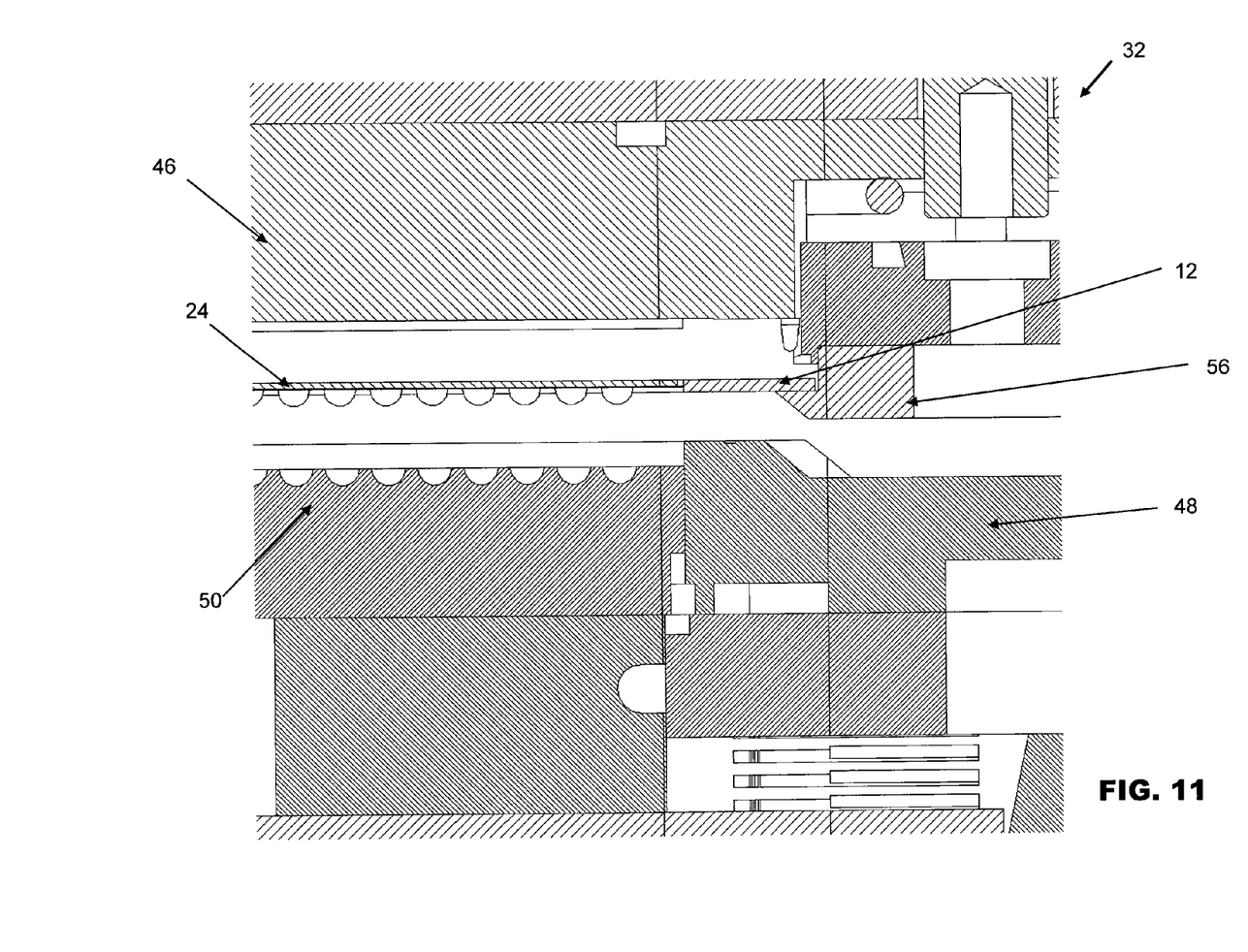

In FIG. 8, when the molding apparatus 32 is in a closed position, the substrate carrier 12 is held between the top cavity plate 46 and the bottom cavity plate 48. Next, the molding apparatus 32 assumes a packing position when the dome insert 50 is raised towards the top cavity plate 46 as shown in FIG. 9 bringing the molding cavities 52 which carry the liquid silicone closer to the top cavity plate 46 in order to immerse the LED devices 24 into the liquid silicone for encapsulation. After the liquid silicone solidifies, the molding apparatus 32 opens and the top and bottom cavity plates 46, 48 are separated as in FIG. 10. The substrate panel 22 with the molded LED devices 24 is lifted from the dome insert 50 together with the substrate carrier 12. Each LED device 24 has been molded in silicone which forms a dome shaped protective cover over the LED device 24. The track plate 56 is then lowered and releases its holding force on the substrate carrier 12 against the top cavity plate 46 (see FIG. 11). The substrate carrier 12 can then be indexed out of the molding apparatus 32 together with the plurality of molded LED devices 24.

It should be appreciated that in the preferred embodiment of the invention, the brittle substrate panel 22 is not subjected to the bulk of the clamping force exerted by the top and bottom molds 42, 44 as the force is mainly exerted on the substrate carrier 12 instead throughout the molding process. The incidences of breakage of the substrate panel 22 can be reduced as a result. As the substrate panel 22 on the substrate carrier 12 is indexed to the molding position in the molding apparatus 32, the substrate carrier 12 can be configured to carry more than one substrate panel 22. This speeds up the process of loading panels of LED devices into the molding apparatus 32 for molding as compared to loading one panel at a time, and also increases productivity when a greater number of LED devices are molded simultaneously.

The invention described herein is susceptible to variations, modifications and/or additions other than those specifically described and it is to be understood that the invention includes all such variations, modifications and/or additions which fall within the spirit and scope of the above description.

The invention claimed is:

1. A method of molding a substrate containing a plurality of electronic devices, comprising the steps of:
   providing a carrier comprising a frame on which an adhesive film is attached, the frame being arranged to surround at least one mounting position of the adhesive film;
   mounting the substrate onto the at least one mounting position of the adhesive film of the carrier such that the frame surrounds the substrate, and, thereafter;
   placing the carrier in a mold such that the frame is located at a clamping area of the mold and the substrate is located at a molding area of the mold where molding cavities are located, wherein the mold comprises a top mold and a bottom mold which move relative to each other to close onto and apply a clamping force on the carrier when clamping the frame at the clamping area;
   clamping the frame at the clamping area while locating the electronic devices in the molding cavities; and
   molding the electronic devices located in the molding cavities with an encapsulant.

2. The method as claimed in claim 1, wherein the carrier comprises an outer frame and an inner frame mounted within a perimeter of the outer frame, wherein the adhesive film is attached to the inner frame for mounting the substrate.

3. The method as claimed in claim 2, wherein the outer frame but not the inner frame is clamped at the clamping area during molding.

4. The method as claimed in claim 2, wherein the outer frame comprises a frame of a wafer ring.

5. The method as claimed in claim 1, further comprising a track plate on the top mold which is operative to grip the carrier and move it relative to both the top and bottom molds, wherein the track plate applies a holding force on the carrier against the top mold after the carrier is placed in the mold.

6. The method as claimed in claim 5, wherein after molding, the track plate is lowered away from the top mold and releases its holding force on the carrier against the top mold.

7. The method as claimed in claim 1, wherein the top mold includes a top support plate and the bottom mold includes a bottom support plate, and the top and bottom support plates are spring biased towards the substrate to apply a compression force onto the substrate via said spring bias after the frame has been clamped at the clamping area.

8. The method as claimed in claim 1, wherein the molding area comprises a mold insert which is detachably insertable into the mold, and wherein the mold insert contains the molding cavities, each cavity being sized and configured to permit the insertion of an electronic device into the molding cavity.

9. The method as claimed in claim 1, wherein each of the molding cavities is dome-shaped.

10. The method as claimed in claim 8, wherein the mold insert is moved relative to the substrate after the frame of the carrier has been clamped so as to contact the substrate and to press the molding cavities against the substrate during molding.

11. The method as claimed in claim 1, wherein the carrier has a plurality of mounting positions surrounded by multiple frames for mounting multiple substrates.

12. The method as claimed in claim 1, wherein the substrate is a ceramic or silicon substrate.

13. The method as claimed in claim 1, wherein the electronic devices are light-emitting diode devices.

* * * * *